US010686776B2

(12) United States Patent
Ning et al.

(10) Patent No.: US 10,686,776 B2
(45) Date of Patent: Jun. 16, 2020

(54) AUTHORIZED CONTROL OF AN EMBEDDED SYSTEM USING END-TO-END SECURE ELEMENT COMMUNICATION

(71) Applicant: Samsung Electronics Co., Ltd, Suwon-si (KR)

(72) Inventors: Peng Ning, Saratoga, CA (US); Yueh-Hsun Lin, Santa Clara, CA (US); Stephen E. McLaughlin, San Jose, CA (US); Michael C. Grace, Santa Clara, CA (US); Ahmed M. Azab, Palo Alto, CA (US); Rohan Bhutkar, Mountain View, CA (US); Yong Choi, Saratoga, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 107 days.

(21) Appl. No.: 15/584,892

(22) Filed: May 2, 2017

(65) Prior Publication Data
US 2018/0026963 A1 Jan. 25, 2018

Related U.S. Application Data

(60) Provisional application No. 62/365,950, filed on Jul. 22, 2016.

(51) Int. Cl.
*H04L 29/00* (2006.01)
*H04L 29/06* (2006.01)
(Continued)

(52) U.S. Cl.
CPC ........ *H04L 63/0807* (2013.01); *H04L 63/045* (2013.01); *H04L 63/0428* (2013.01);
(Continued)

(58) Field of Classification Search
CPC .......... H04L 2463/102; H04L 63/0853; H04L 63/126; H04L 67/1002; H04L 63/20
See application file for complete search history.

(56) References Cited

U.S. PATENT DOCUMENTS

| 6,161,005 A | 12/2000 | Pinzon |
| 7,236,783 B2 | 6/2007 | Gould |

(Continued)

FOREIGN PATENT DOCUMENTS

| WO | 2011102369 | 2/2011 |
| WO | 2012139619 | 12/2011 |

(Continued)

OTHER PUBLICATIONS

International Search Report for International Application No. PCT/KR2017/007951, dated Nov. 2, 2017, (9 pages).
(Continued)

*Primary Examiner* — Ghazal B Shehni

(57) ABSTRACT

A connected device includes an application processor, a secure element, and a control module. The application processor is configured to receive a control command from an electronic device. The secure element is connected between the application processor and a control module and is configured to authenticate the control command. The control module is configured to receive the control command when the control command is authenticated by the secure element, execute the control command to activate at least one function of the connected device, and transmit a response to the electronic device.

20 Claims, 10 Drawing Sheets

(51) Int. Cl.
*H04W 12/04* (2009.01)
*H04W 12/06* (2009.01)
*H04W 12/08* (2009.01)
*H04W 4/70* (2018.01)
*H04W 4/80* (2018.01)
*H04W 12/00* (2009.01)

(52) U.S. Cl.
CPC ...... *H04L 63/0435* (2013.01); *H04L 63/0442* (2013.01); *H04L 63/061* (2013.01); *H04W 12/0403* (2019.01); *H04W 12/0407* (2019.01); *H04W 12/06* (2013.01); *H04W 12/08* (2013.01); *H04W 4/70* (2018.02); *H04W 4/80* (2018.02); *H04W 12/003* (2019.01)

(56) References Cited

U.S. PATENT DOCUMENTS

| | | | |
|---|---|---|---|
| 7,891,004 | B1 | 2/2011 | Gelvin et al. |
| 8,756,430 | B2 | 6/2014 | Kherani et al. |
| 8,761,390 | B2 | 6/2014 | Peirce et al. |
| 8,884,738 | B2 | 11/2014 | Spangenberg et al. |
| 8,966,560 | B2 | 2/2015 | Tine et al. |
| 8,983,681 | B2 | 3/2015 | Yi et al. |
| 9,047,494 | B1 | 6/2015 | Smith |
| 9,055,025 | B2 | 6/2015 | Patenaude et al. |
| 9,132,806 | B2 | 9/2015 | De Los Santos et al. |
| 9,148,743 | B2 | 9/2015 | Timm et al. |
| 9,154,946 | B2 | 10/2015 | Knobbe et al. |
| 9,209,977 | B2 | 12/2015 | Catsburg et al. |
| 2008/0287074 | A1 | 11/2008 | Grunhold |
| 2011/0047630 | A1 | 2/2011 | Cheng et al. |
| 2012/0124374 | A1 | 5/2012 | Murray |
| 2013/0204495 | A1 | 8/2013 | Reed et al. |
| 2013/0219170 | A1* | 8/2013 | Naitou ............... H04L 63/0428 713/153 |
| 2014/0350778 | A1* | 11/2014 | Gressus ............... B60R 16/00 701/32.6 |
| 2015/0024688 | A1 | 1/2015 | Hrabak et al. |
| 2015/0103204 | A1 | 4/2015 | Suzuki |
| 2015/0222517 | A1 | 8/2015 | McLaughlin et al. |
| 2015/0289116 | A1 | 10/2015 | Lei et al. |
| 2015/0379790 | A1 | 12/2015 | Hatton |
| 2016/0044364 | A1 | 2/2016 | Bai et al. |
| 2016/0063783 | A1 | 3/2016 | Bruns et al. |
| 2016/0134640 | A1 | 5/2016 | Cregg et al. |
| 2016/0164678 | A1 | 6/2016 | Nix |
| 2016/0173495 | A1* | 6/2016 | Joo ..................... H04L 63/08 713/171 |
| 2016/0197772 | A1 | 7/2016 | Britt et al. |

FOREIGN PATENT DOCUMENTS

| | | |
|---|---|---|
| WO | 2015053559 | 4/2015 |
| WO | 2016068442 A1 | 5/2016 |

OTHER PUBLICATIONS

Supplementary European Search Report dated May 9, 2019 in connection with European Patent Application No. 17 83 1402, 9 pages.

* cited by examiner

AUTHORIZED CONTROL OF AN EMBEDDED SYSTEM USING END-TO-END SECURE ELEMENT COMMUNICATION

CROSS-REFERENCE TO RELATED APPLICATION AND CLAIM OF PRIORITY

This application claims priority under 35 U.S.C. § 119(e) to U.S. Provisional Patent Application No. 62/365,950 filed on Jul. 22, 2016. The above-identified provisional patent application is hereby incorporated by reference in its entirety.

TECHNICAL FIELD

This disclosure relates generally to controlling devices using a remote device. More specifically, this disclosure relates to a method and apparatus for securing communications between devices.

BACKGROUND

The Internet, which is a human centered connectivity network where humans generate and consume information, is now evolving to the Internet of Things (IoT) where distributed entities, such as connected devices that exchange and process information without human intervention. An increasingly important aspect of the IoT is the ability of users to remotely and/or automatically control physical devices around them. An important aspect of remote and automatic control is authorization, meaning that the user's mobile device or computer must prove itself to the IoT device before control signals or commands may be executed. For example, a phone must prove to a car that it is authorized to start the car. However, existing authorization solutions have a fundamental limitation. Both a user's mobile device and IoT devices are subject to compromise in the case, e.g. a hack, which may be based on an existing software flaw. As such, there is a need for solutions to secure communications with a user's mobile device that are relatively immune to a hack.

SUMMARY

The present disclosure relates to an authorized control of an embedded system.

In a first embodiment, a connected device includes an application processor, a secure element, and a control module. The application processor is configured to receive a control command from an electronic device. The secure element is configured to authenticate the control command, the secure element is connected between the application processor and a control module. The control module is configured to receive the control command when the control command is authenticated by the secure element, execute the control command to activate at least one function of the connected device, and transmit a response to the electronic device.

In a second embodiment, a method for controlling a connected device with an electronic device includes receiving a first public key from a secure element of the electronic device, transmitting a second public key from a secure element of the connected device to the electronic device, and connecting to the electronic device based on the first public key and the second public key. The method also includes authenticating, by the secure element of the connected device, a control command from the electronic device and authorizing, by the secure element of the connected device, the control command from the electronic device. Once the control command is authenticated and authorized, the control command is executed.

In a third embodiment, non-transitory computer readable medium embodying a computer program, the computer program comprising computer readable program code that when executed causes at least one processing device to receive a first public key from a secure element of the electronic device and transmit a second public key from a secure element of the connected device to the electronic device. The electronic device and connected device are connected based on the first public key and the second public key. The at least one processing device also authenticates, by the secure element of the connected device, a control command from the electronic device and authorizes, by the secure element of the connected device, the control command from the electronic device. Once the control command is authenticated and authorized, the control command is executed.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 10, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged device or system.

Embodiments of the present disclosure describe the use of a secure element in the user's device, e.g., smartphone or wearable device, a secure element in an IoT device, and an optional Trusted Third Party (TTP) used for pairing the secure element of the user's device with the secure element of the IoT device. The secure element may be an integrated circuit that is hardware isolated and used to store highly sensitive data and perform computations on that data. The user device and IoT device may first pair with one another. This pairing may be assisted by a TTP server or the user may conduct the pairing without the assistance of a third party. The user device authenticates itself to the IoT device. Thus, in an embodiment, the secure element of the user's device and the secure element of the IoT device carry out authorization on behalf of their respective host devices. If the user device is authenticated, then the secure element of the IoT device decides what actions it is allowed to perform.

Figure 1:
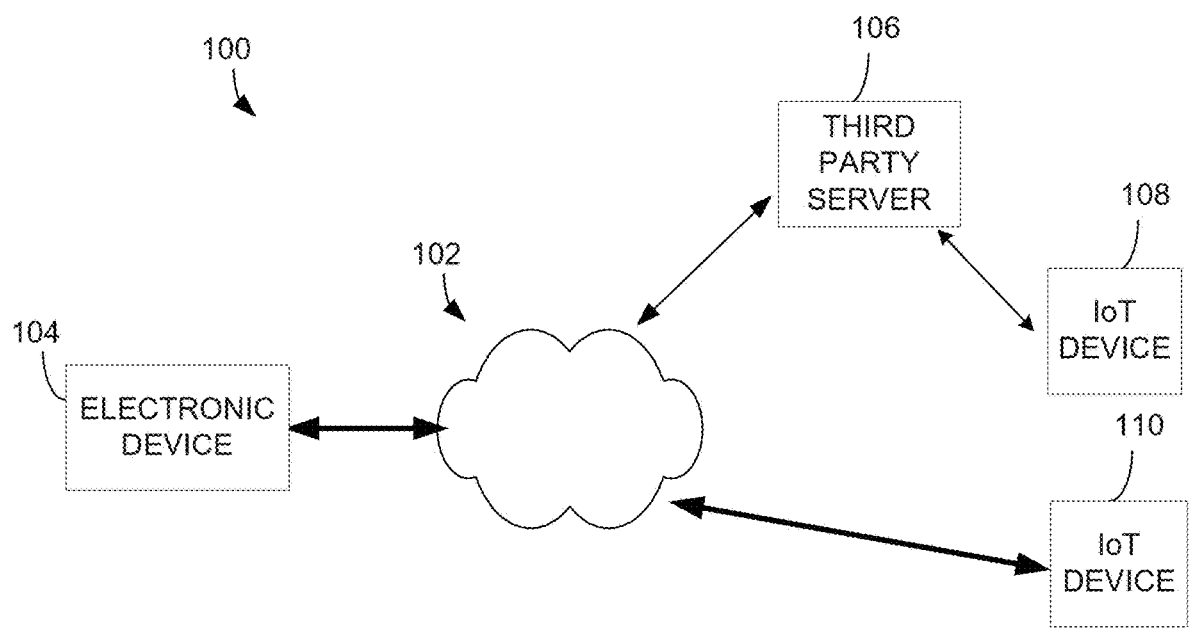
FIG. 1 illustrates an example computing system according to this disclosure.

FIG. 1 illustrates an example computing system 100 according to this disclosure. The embodiment of the computing system 100 shown in FIG. 1 is for illustration only. Other embodiments of the computing system 100 could be used without departing from the scope of this disclosure.

As shown in FIG. 1, the system 100 includes a network 102, which facilitates communication between various components in the system 100. For example, the network 102 may communicate Internet Protocol (IP) packets, frame relay frames, Asynchronous Transfer Mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between the electronic device 104 and a third party server 106 and various Internet of Things (IoT) devices 108, 110. The electronic device 104 may be, for example, a smartphone, a wearable device, or head-mounted display (HMD).

Each IoT device 108, 110 represents any suitable computing or processing device that interacts with at least one electronic device or other computing device(s) over the network 102. For example, the IoT devices 108 may be a connected device. In this example, the IoT devices 108, 110 may include an electronic device, which, according to various embodiments of the present disclosure, may include at least one of, for example, a home appliance, an automobile, or a dongle configured to connect to the home appliance or automobile.

As described in more detail below, the electronic device 104 establishes a secure communication with one or more of the IoT devices 108, 110 in order to control one or more of the IoT devices 108, 110. The electronic device 104 may communicate directly with the IoT device 110 or may communicate with the TOT device 108 via a third party server 106.

Although FIG. 1 illustrates one example of a computing system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
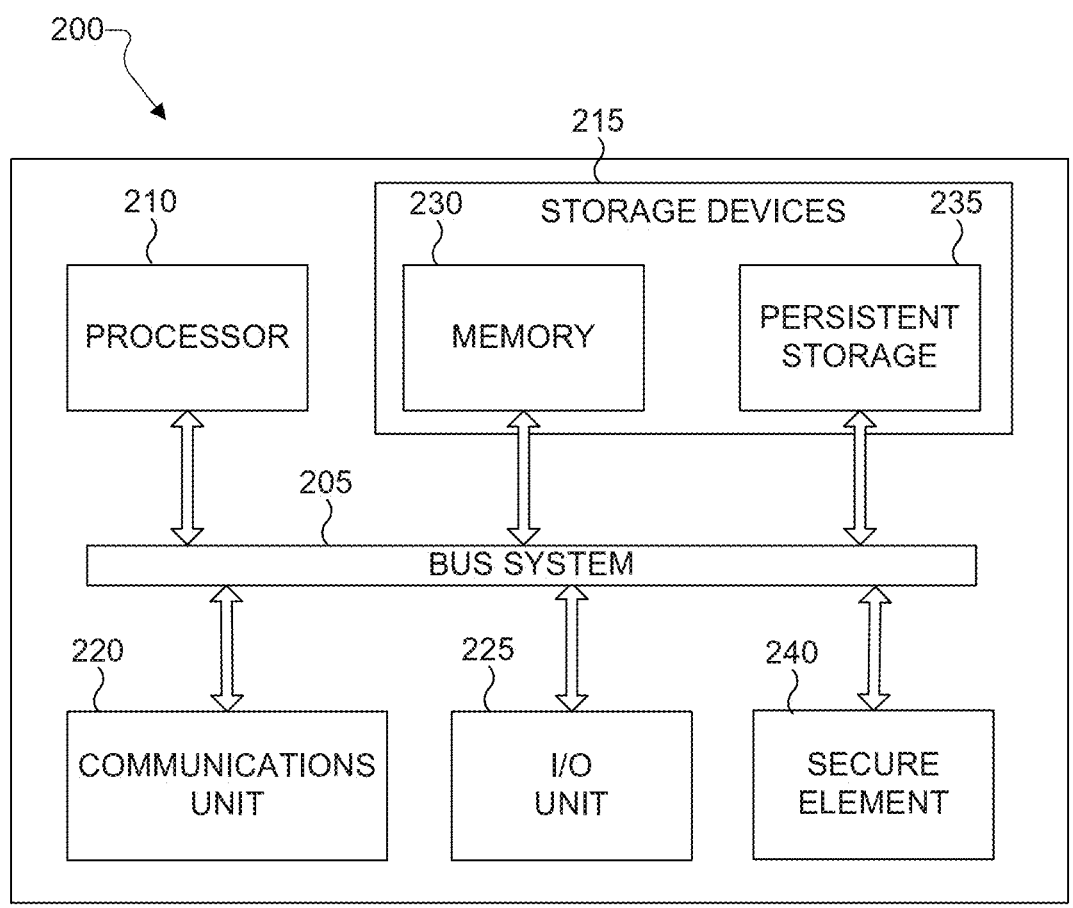
FIG. 2 illustrates an example device in a computing system according to this disclosure.
Figure 3:
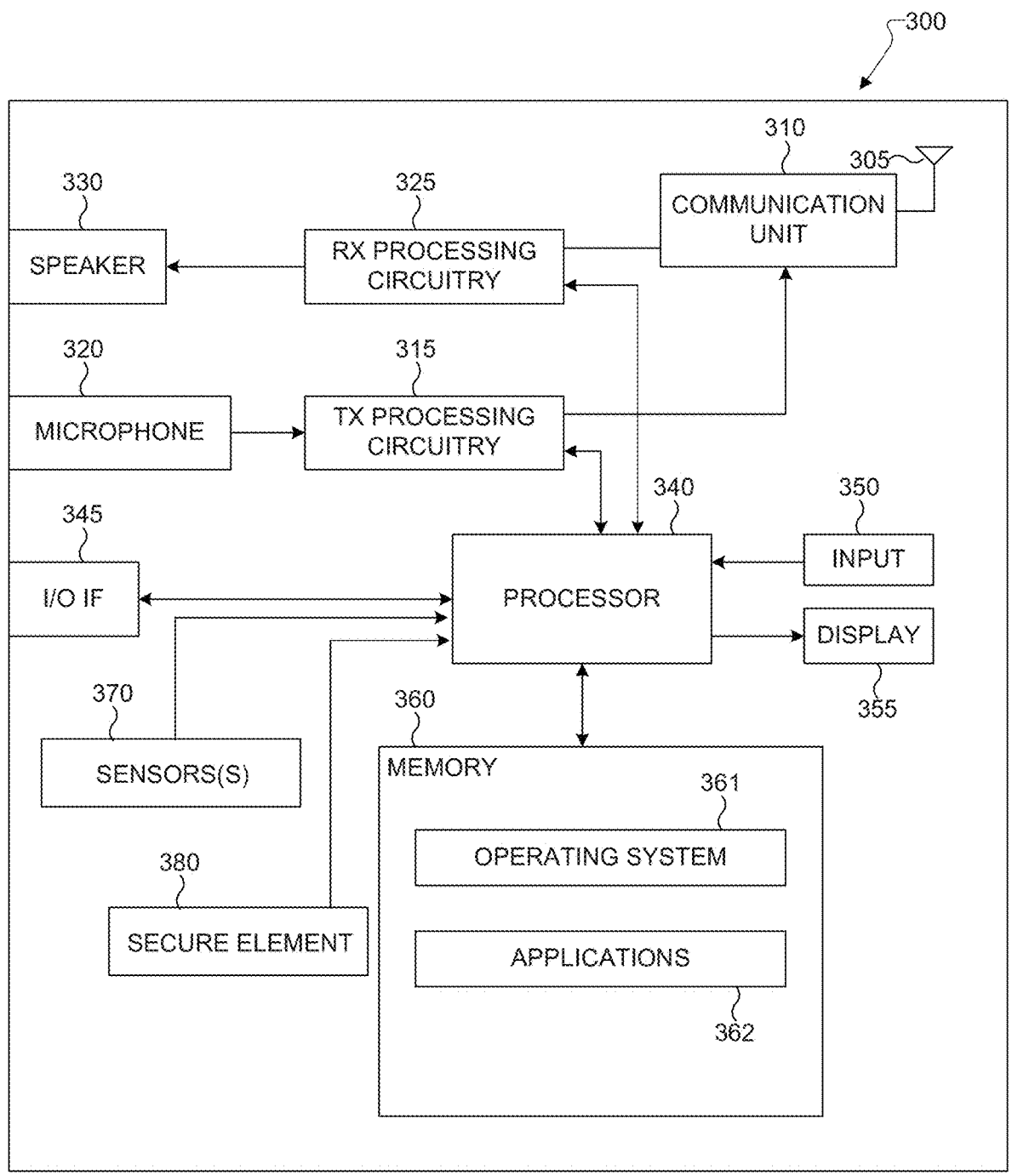
FIG. 3 illustrates an example electronic device according to this disclosure.

FIGS. 2 and 3 illustrate example devices in a computing system according to this disclosure. In particular, FIG. 2 illustrates an example IoT device 200, and FIG. 3 illustrates an example electronic device 300. For example, the IoT devices 108 may be a connected device. The IoT device 200 could also represent the one or more of the IoT devices 108, 110 in FIG. 1, and the electronic device 300 could represent the electronic device 104 in FIG. 1.

As shown in FIG. 2, the IoT device 200 includes a bus system 205, which supports communication between at least one processor 210, at least one storage device 215, and at least one communications unit 220.

The processor 210 executes instructions that may be loaded into a memory 230. The processor 210 may include any suitable number(s) and type(s) of processors or other devices in any suitable arrangement. Example types of processors 210 include microprocessors, microcontrollers, digital signal processors, field programmable gate arrays, application specific integrated circuits, and discreet circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc. Memory 230 stores an application thereon that is used to control one or more functions of the IoT device 200.

The communications unit 220 supports communications with other systems or devices. For example, the communications unit 220 could include a network interface card or a wireless transceiver facilitating communications over the network 102. The communications unit 220 may support communications through any suitable physical or wireless communication link(s).

In some embodiments, the IoT device 200 may include an I/O unit 225 that allows for input and output of data. For example, the I/O unit 225 may provide a connection for user input through a keyboard, mouse, keypad, touchscreen, or other suitable input device. The I/O unit 225 may also send output to a display, printer, or other suitable output device.

As will be described below, the IoT device 200 includes a secure element 240 that is responsible for verifying the authenticity of commands from an electronic device 300 and authorizing control commands based on their source.

Although FIG. 2 illustrates one example of an IoT device 200, various changes may be made to FIG. 2. For example, the IoT device 200 could include any number of each component shown in FIG. 2.

FIG. 3 illustrates an example electronic device 300 according to this disclosure. The embodiment of the electronic device 300 illustrated in FIG. 3 is for illustration only, and the electronic device 104 of FIG. 1 could have the same or similar configuration. However, electronic devices come in a wide variety of configurations, and FIG. 3 does not limit the scope of this disclosure to any particular implementation of an electronic device. In one or more embodiments of this disclosure, the electronic device 300 may be replaced by a television or a HMD.

As shown in FIG. 3, the electronic device 300 includes a communication unit 310. The communication unit 310 may include, for example, a RF transceiver, a Bluetooth transceiver, or a WiFi transceiver. The mobile device 300 may also include transmit (TX) processing circuitry 315, a microphone 320, and receive (RX) processing circuitry 325. The electronic device 300 also includes a speaker 330, a processor 340, an input/output (I/O) interface (IF) 345, an input 350, a display 355, and a memory 360. The memory 360 includes an operating system (OS) program 361 and one or more applications 362.

The communications unit 310 may receive an incoming RF signal such as, e.g., a Bluetooth signal or a WiFi signal. The "communications unit 310" may down convert the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The communication unit 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the basic OS program 361 stored in the memory 360 in order to control the overall operation of the electronic device 300. For example, the processor 340 could control the reception of forward channel signals and the transmission of reverse channel signals by the communication unit 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS program 361 or in response to signals received from eNBs or an operator. The processor 340 is also coupled to the I/O interface 345, which provides the electronic device 300 with the ability to connect to other devices such as laptop computers and handheld computers. The I/O interface 345 is the communication path between these accessories and the processor 340.

The processor 340 is also coupled to the input 350 and the display 355. The operator of the electronic device 300 can use the input 350 (e.g., keypad, touchscreen, button etc.) to enter data into the electronic device 300. The display 355 may be a liquid crystal display, a light-emitting diode (LED) display, an optical LED (OLED), an active matrix OLED (AMOLED), a transparent or opaque display such one or more lenses on a pair of augmented reality glasses where one or more images maybe projected onto or displayed using the lens, or other display capable of rendering text and/or at least limited graphics, such as from web sites. In one embodiment, the input 350 is a touchscreen. The touchscreen could include a touch panel, a (digital) pen sensor, a key, or an ultrasonic input device. The touchscreen could recognize, for example, a touch input in at least one scheme among a capacitive scheme, a pressure sensitive scheme, an infrared scheme, or an ultrasonic scheme. The touchscreen could also include a control circuit. In the capacitive scheme, the touchscreen could recognize touch or proximity.

The memory 360 is coupled to the processor 340. Part of the memory 360 could include a random access memory (RAM), and another part of the memory 360 could include a Flash memory or other read-only memory (ROM).

Electronic device 300 may further include one or more sensors 370 that can meter a physical quantity or detect an activation state of the electronic device 300 and convert metered or detected information into an electrical signal. For example, sensor 370 may include one or more buttons for touch input, e.g., on the headset or the electronic device 300, a gesture sensor, an eye tracking sensor, a gyroscope or gyro sensor, an air pressure sensor, a magnetic sensor or magnetometer, an acceleration sensor or accelerometer, a grip sensor, a proximity sensor, a color sensor (e.g., a Red Green Blue (RGB) sensor), a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, etc. The sensor(s) 370 can further include a control circuit for controlling at least one of the sensors included therein. As will be discussed in greater detail below, one or more of these sensor(s) 370 may be used to control a UI, detect UI inputs, determine the orientation and facing direction of the user for 3D content display identification, etc. Any of these sensor(s) 370 may be located within the electronic device 300, within a headset configured to hold the electronic device 300, or in both the headset and electronic device 300, for example, in embodiments where the electronic device 300 includes a headset.

Electronic device 300 may also include a secure element 380. Secure element 380 is a small, hardware isolated, environment for storing highly sensitive data and performing computations on that data.

Although FIG. 3 illustrates one example of electronic device 300, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs).

Figure 4:
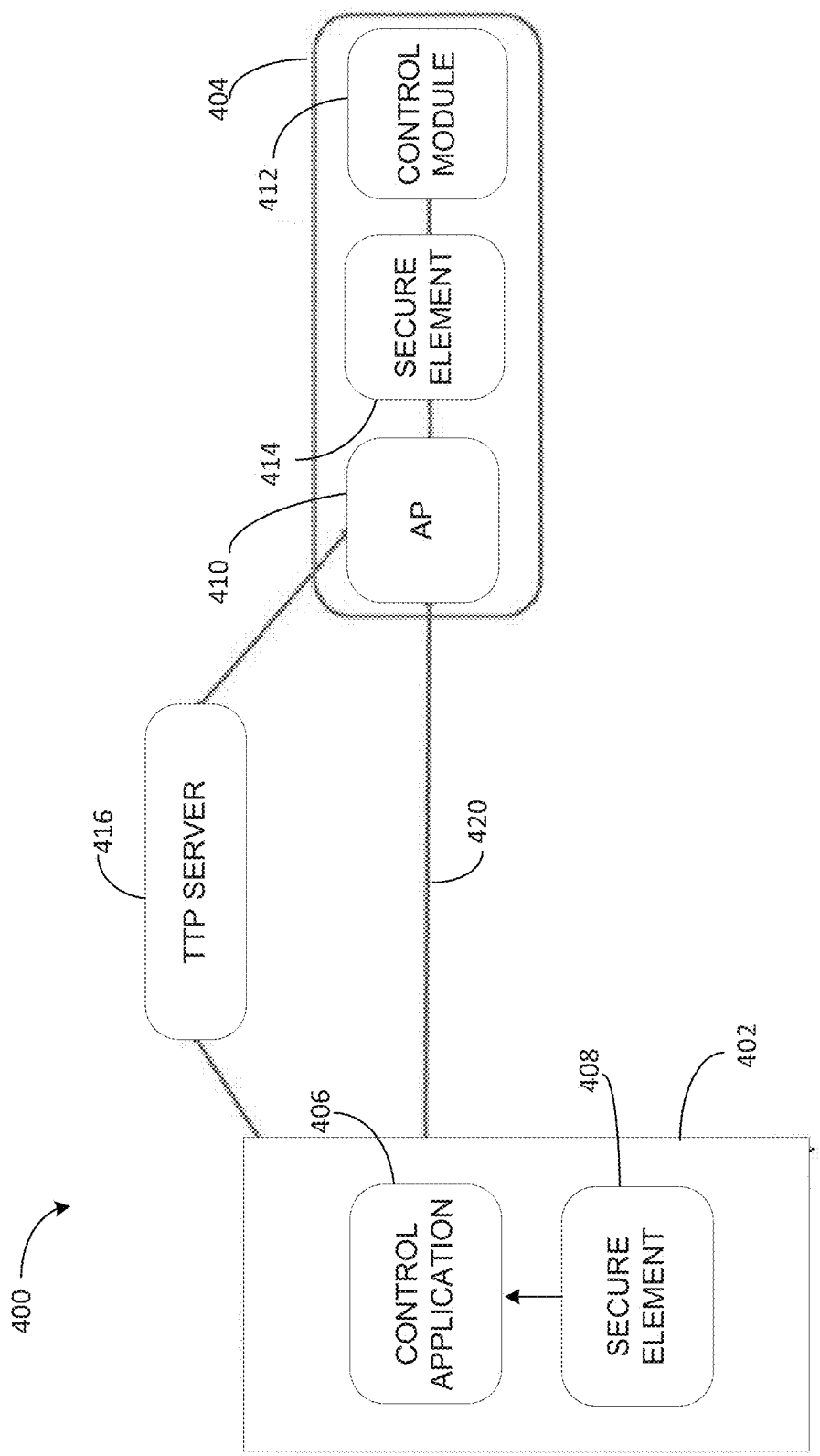
FIG. 4 illustrates an example system according to this disclosure.

FIG. 4 illustrates an example system 400 that may include an electronic device 402 and an IoT device 404 according to an embodiment of the present disclosure. Electronic device 402 illustrates one example of the electronic device 300 that may be used with the embodiments of the present disclosure. As shown in FIG. 4, electronic device 402 may be, for example, a mobile phone. In other embodiments, the electronic device may be a smart watch, a tablet, a key fob.

The electronic device 401 includes a control application 406 and a secure element 408. The control application 406 will interact with the user or server to determine what control commands to issue to the IoT device 404. The control application 406 does not authenticate commands and may only be used for some limited configuration of the secure element 408. For example, in a passive keyless entry scenario, the secure element 408 may be directly connected to a communication channel 420, e.g., Bluetooth Low Energy (BLE) or any contact or contactless interface. When the secure element 408 detects that the user is close to the vehicle, it automatically executes the door unlocking protocol. In this case, the control application 406 might only be used to dictate a set of user preferences (seat position, climate control, etc.) to the secure element 408.

Secure element 408 includes information needed for authenticating commands to the IoT device 404. The secure element 408 will participate in both an online pairing phase and a subsequent offline command phase. To issue an authenticated command, the secure element 408 will be activated, either by the control application 406 or by some sensor input, e.g., proximity detection to the IoT device 404. It will then execute an offline command protocol as described below.

The IoT device 404 The IoT device receives authenticated control commands from the electronic device 402, checks the authentication, and then executes the commands based on an authorization policy, i.e., if the authenticated source of the command is allowed to execute the given command. The IoT device 404 may include an application processor 410, a control module 412, and a secure element 414.

The application processor (AP) 410 is the main Central Processing Unit (CPU) and Input/Output (IO) processor for the IoT device 404. The AP 410 provides network and other connectivity, e.g., BLUETOOTH®, for the IoT device 404. The AP 410 is not trusted to execute commands affecting the physical state of the IoT device 404. For example, if the IoT device 404 is an automobile, the AP 410 cannot directly unlock car doors, start the engine, etc. Instead, the AP 410 can merely relay authenticated commands from the electronic device 402 to the secure element 414.

The control module 412 is a chip or sub-module of the IoT device that can send electrical signals to physically manipulate the IoT device 404, i.e., the door locks. The control module 412 can only receive commands from the secure element 414, thus ensuring that all executed commands must be authenticated and authorized by an IoT applet in the secure element 414.

The secure element 414 is responsible for verifying the authenticity of commands from the electronic device 402 and authorizing control commands based on their source. Running on the secure element 414 is an IoT applet (not shown). The IoT applet is software responsible for authenticating and authorizing control commands. Only commands that are authorized by the IoT applet can be executed by the IoT device 404. The communications bus between the AP 410 and control module 412 is split in half. The secure element 414 joins the two bus halves. The secure element 414 hardware or operating system delivers any communications from the AP-side of the bus to the IoT applet. The IoT applet then forwards the communications to the control module 412 via the other half of the bus.

In some embodiments, a trusted third party (TTP) server 416 may be included in system 400. The TTP server 416 may be used for the online pairing phase. If the TTP server 416 is used, the TTP server 416 will maintain a mapping from IoT devices to cryptographic signature. When a given electronic device 402 can provide the cryptographic signature for a given IoT device 404, the TTP server 416 will the conduct an exchange of public keys between the electronic device 402 and IoT device 404.

Figure 5:
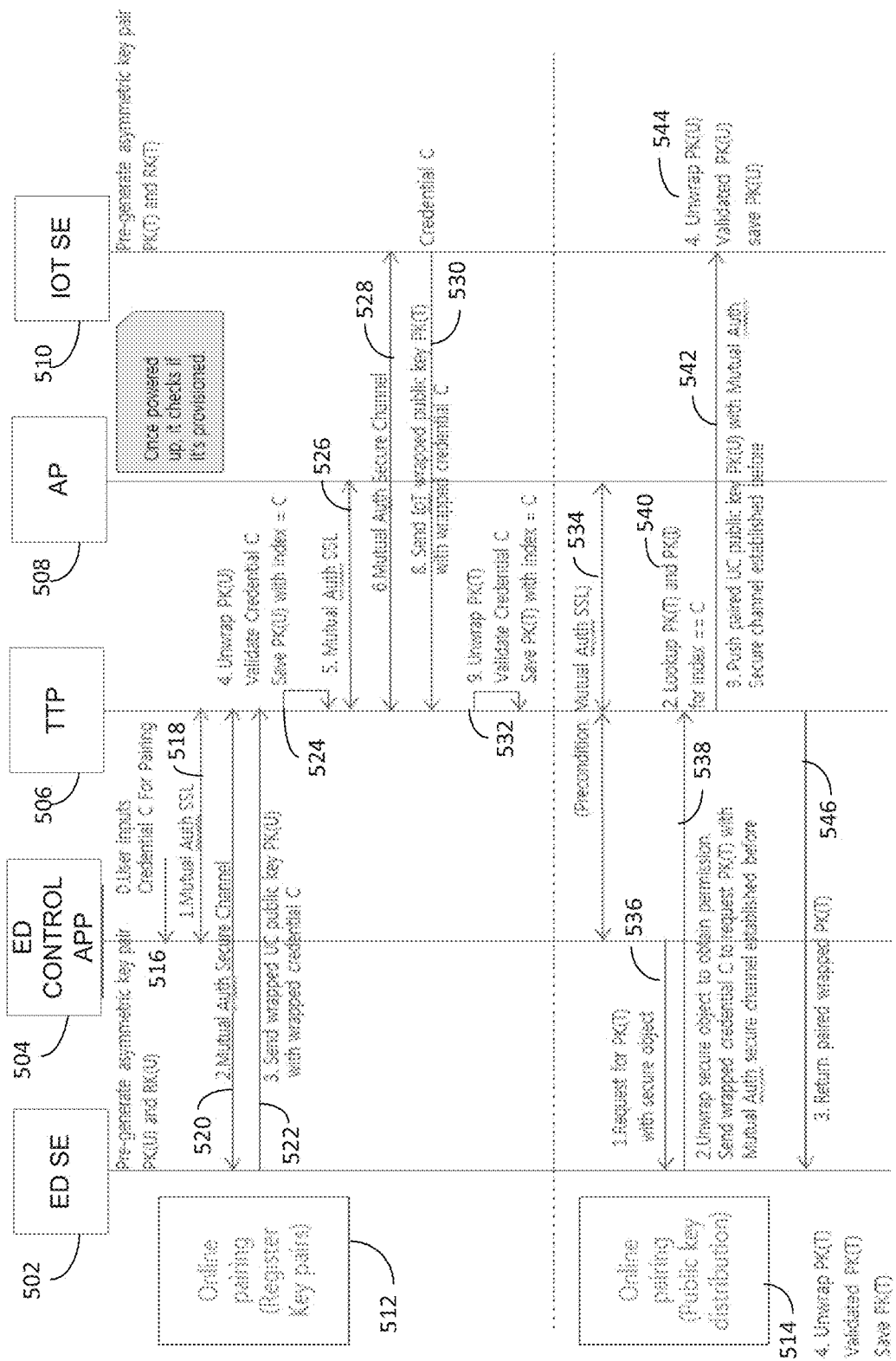
FIG. 5 illustrates an example method for online pairing according to this disclosure.

FIG. 5 illustrates an example method for online paring according to this disclosure. As shown in FIG. 5, the online pairing involves the electronic device secure element 502, the electronic device control application 504, a TTP server 506, an AP 508, and the IoT secure element 510. Before the online paring is performed, the electronic device secure element 502 generates an asymmetric key pair PK(U) and RK(U). The IoT secure element also generates an asymmetric key pair PK(T) and RK(T). The online pairing may be performed in two stages: (i) a register key pair stage 512; and (ii) a public key distribution stage 514. In the register key pair stage 512, the user must first input a credential C (516). This credential can be present from the time the IoT device is purchased or activated, e.g., present as a sticker inside the box or from a registration form on the vendor's website. The TTP server 506 performs a mutual authentication with the electronic device control application 504 (518) and then establishes a secure channel (520) with the electronic device secure element 502. Once the secure channel is established, the electronic device secure element 502, transmits the electronic device's wrapped public key PK(U) with the wrapped credential C to the TTP server 506 (522). The TTP server 506 unwraps the PK(U), validates the credential C, and saves the PK(U) with the index equal to C (524).

If the TTP server 506 can verify that C is the correct credential corresponding to the IoT device, the TTP server 506 it will then request the same credential from the IoT device itself as shown in the following steps. The TTP server 506 performs a mutual authentication with the AP 508 (526) and then establishes a secure channel (528) with the IoT secure element 510. Once the secure channel is established, the IoT secure element 510, transmits the IoT device's wrapped public key PK(T) with the wrapped credential C to the TTP server 506 (530). The TTP server 506 unwraps the PK(T), validates the credential C, and saves the PK(U) with the index equal to C (532).

If the IoT device provides a matching C value, then the protocol is allowed to move to the public key distribution stage 514. During the public key distribution stage 514, the TTP server 506 will conduct an exchange of public keys between the electronic device secure element 502 and the IoT secure element 510. The public key distribution stage 514 performs a mutual authentication between the TTP server 506 and the electronic device control application 504 and the TTP server 506 and the AP 508 (534). The electronic device control application 504 transmits a request for the PK(T) with a secure object to the electronic device secure element 502 (536). The electronic device secure element 502 unwraps the secure object to obtain permission and transmits the wrapped credential C to request the PK(T) over the previously established secure channel to the TTP server 506 (538). The TTP server 506 looks up the PK(T) and the PK(U) for the index C (540) and transmits the PK(U) over the previously established secure channel to the IoT secure element 510 (542). The IoT secure element 510 unwraps, validates, and saves the PK(U) (544). The TTP server 506 returns the pair wrapped PK(T) to the electronic device secure element 502 (546).

Figure 6:
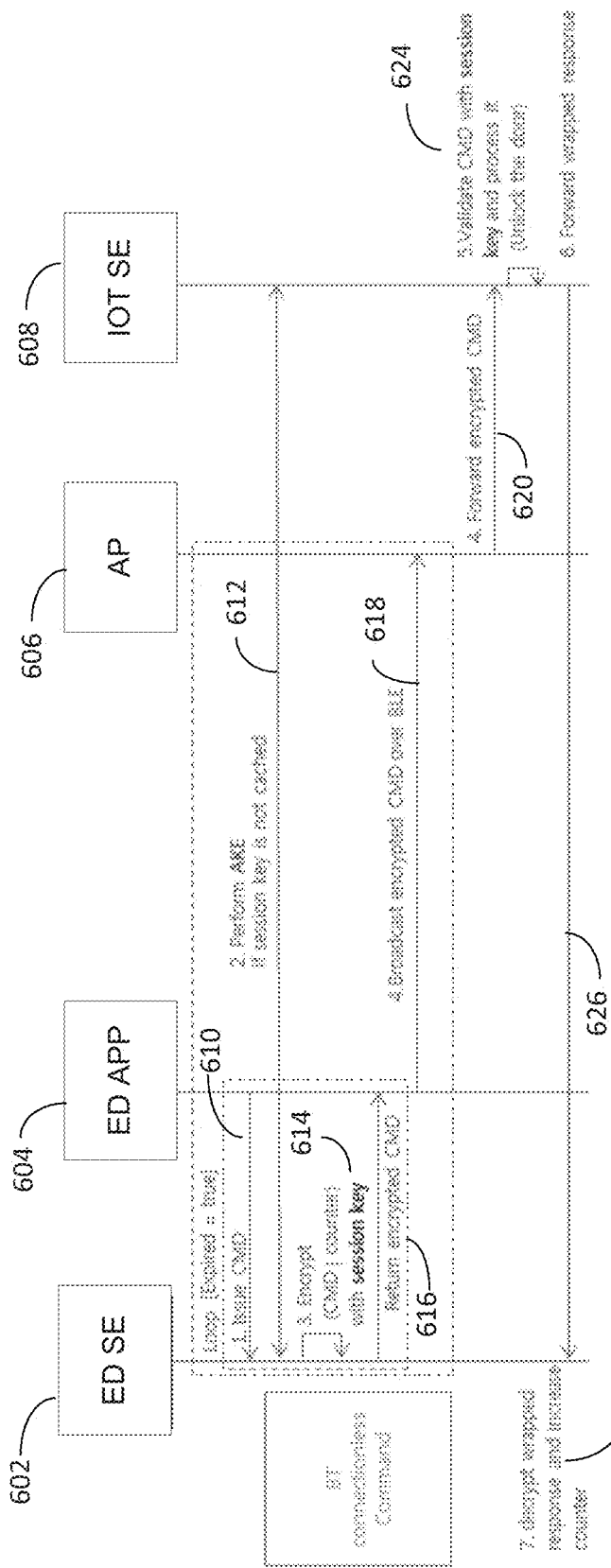
FIG. 6 illustrates an example method for offline pairing according to this disclosure.
Figure 7:
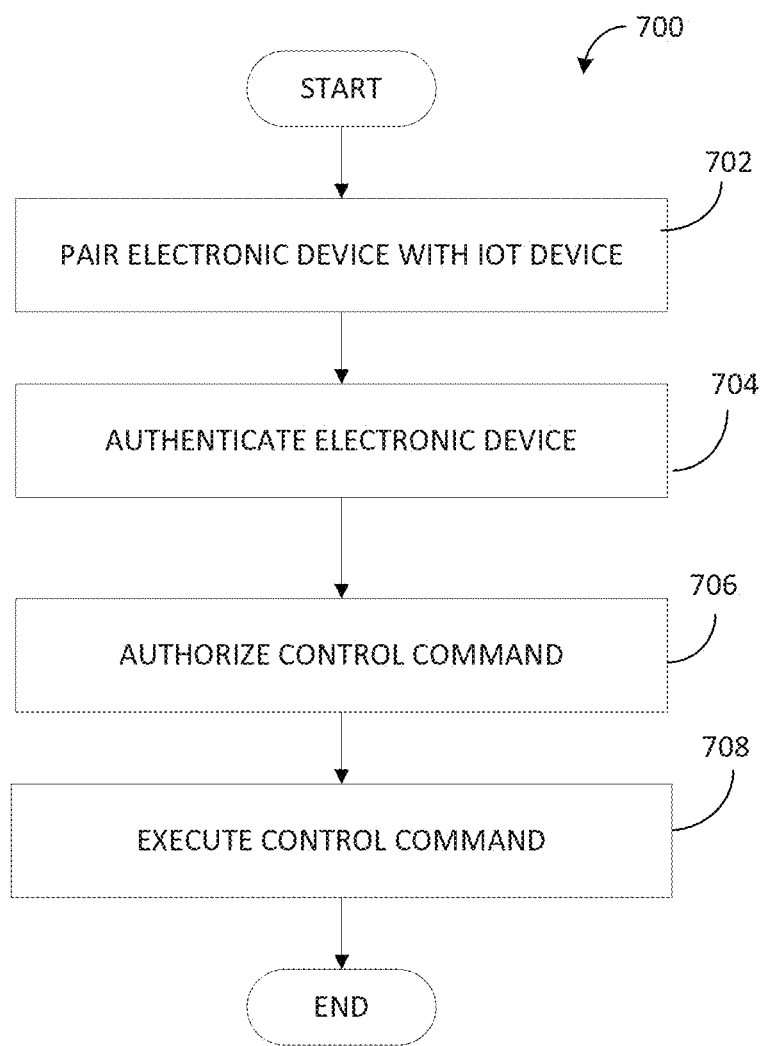
FIG. 7 illustrates a flowchart of a method for controlling an IoT device with an electronic device according to this disclosure.

FIG. 6 illustrates an example method for offline pairing according to this disclosure. As shown in FIG. 6, the online pairing involves the electronic device secure element 602, the electronic device application 604, an AP 606, and the IoT secure element 608. This offline pairing begins when the electronic device application 604 or other sensor (not shown) issues a command to the electronic device secure element 602 (610). The electronic device secure element 602 will then execute an Authenticated Key Exchange (AKE) between the electronic device secure element 602 and the IoT secure element 608 (612). The command is then encrypted and integrity protected using the session key generated by the AKE (614). The command is broadcasted over a communication medium, such as BLUETOOTH® to the AP 606 (616). The command is forwarded from the AP 606 to the IoT secure element 608 (618). If the command is successfully authenticated (624) it is forwarded to the authorization phase with the identity of the sender and a response is returned to the electronic device secure element 602 (626). In some embodiments, the response is a plaintext data containing status code, for example, success or failure, with error debugging information. The response carries a counter to prevent replay attacks. This response is wrapped with the session key(s) derived before to ensure its authenticity and integrity against attackers who can eavesdrop, inject, and/or modify any messages in this session. In the authorization phase, the IoT secure element 608 (specifically, the IoT Applet) examines the control command and the source, e.g., the public key of the sender, and decides if the command can be executed according to a given policy, i.e., there may be a per-sender policy. The electronic device secure element 602 decrypts the wrapped response and increases the counter (628). The counter is a numeric value (integer, long, or even bigger numeric data type) to keep trace of the number of messages exchanged between control and IoT devices to avoid replay attacks as well as provide forward secrecy for each session. Once the session terminates, the new session will generate an ephemeral secret in the new session FIG. 7 illustrates a flowchart of a method 700 for controlling an IoT device with an electronic device according to this disclosure. The flowchart of FIG. 7 will be described in conjunction with FIGS. 4-6. In step 702, the electronic device 402 and the IoT device 404 are paired together by exchanging asymmetric public keys between the secure element 408 and secure element 414. As described above, the pairing may occur via a TTP server 416 or direct communication between the electronic device 402 and the IoT device 404 via BLUETOOTH®.

After the devices are paired, in step 704, commands from the electronic device 402 are authenticated by the IoT device 404 by executing the AKE between the electronic device 402 and the IoT device 404 as described in FIG. 6. The control command is encrypted using the session key generated by the AKE and transmitted to the IoT device 404. The IoT device 404 then authenticates the control command using the session key generated by the AKE.

Once the control command is authenticated, the IoT device 404 authorizes the control command in step 706. In order to authorize the command, the IoT secure element 414 (specifically, the IoT applet) examines the control command and the source, e.g., the public key of the sender, and decides if the control command can be executed according to a given policy. The policy may include any specification of commands available depending on the IoT devices, different roles of a sender, various time periods, and/or different content carried within the command body. For example, in one embodiment, the policy may be a per-sender policy such as that presented in Transparent, Secure Element-based Mediation of On-Board Diagnostic Commands as described in U.S. patent application Ser. No. 15/048,531, which is herein incorporated by reference. Once the control command is authorized, the control command is passed to the control module 412 that executes the control command, e.g., open locked doors, start automobile, turn on lights, etc.

Figure 8:
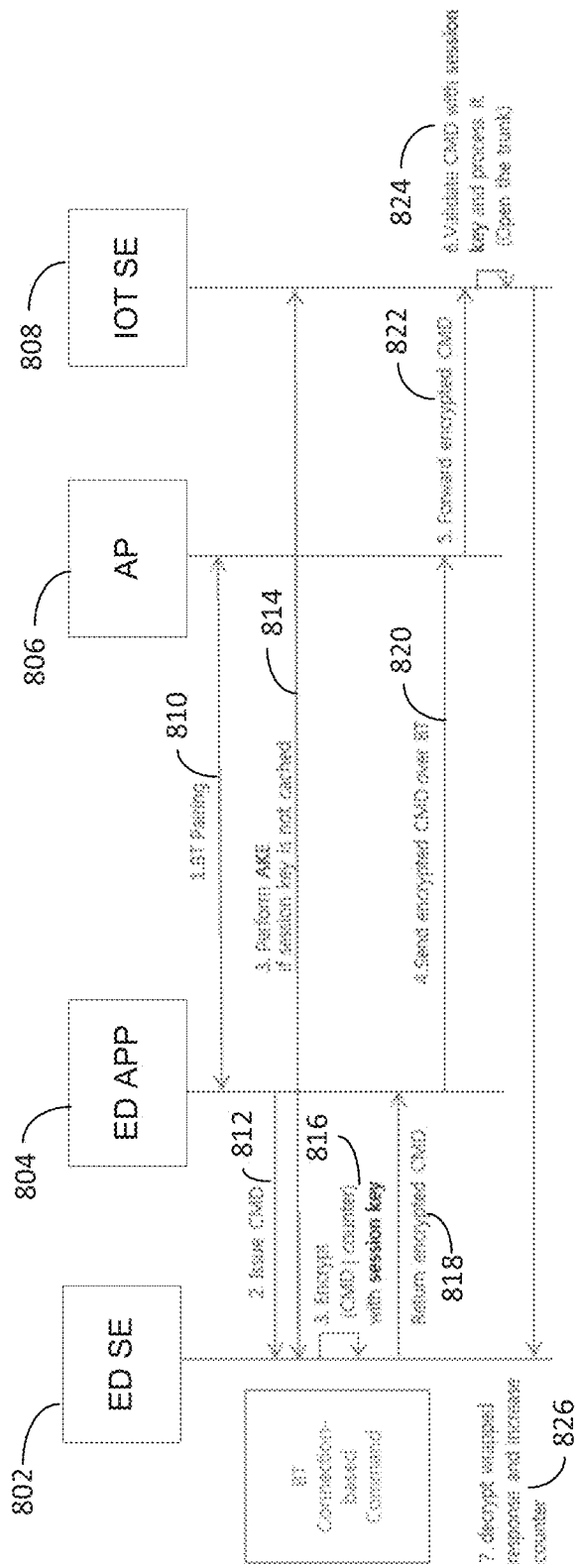
FIG. 8 illustrates an example authentication method according to this disclosure.

FIG. 8 illustrates an example authentication method according to this disclosure. As shown in FIG. 8, the authentication method involves the electronic device secure element 802, the electronic device application 804, an AP 806, and the IoT secure element 808. The method begins with a BLUETOOTH® pairing between the electronic device application 804 and the AP 806 (810). The electronic device application 804 issues a command to the electronic device secure element 802 (812). The electronic device secure element 802 will then execute an Authenticated Key Exchange (AKE) between the electronic device secure element 802 and the IoT secure element 808 if the session key is not cached (814). The command is then encrypted and integrity protected using the session key generated by the AKE (816). The command is broadcasted over a communication medium, such as BLUETOOTH® to the AP 806 (820). The command is forwarded from the AP 806 to the IoT secure element 808 (822). If the command is successfully validated (824) it is forwarded to the authorization phase with the identity of the sender and a response is returned to the electronic device secure element 802. The electronic device secure element 802 decrypts the wrapped response and increases the counter (826).

In some embodiments multiple pairings may be permitted, allowing a single device to connect and control multiple devices, or even a mesh network of connected devices. Based on the type of device, differing layers of security may be utilized. For example, a connected light may have less security, while a smart lock or a car may have greater security. The classification may be performed during the pairing and stored for future communications. This can be adjusted by negotiating metadata (security policy) between establishing a secure channel between devices.

Figure 9:
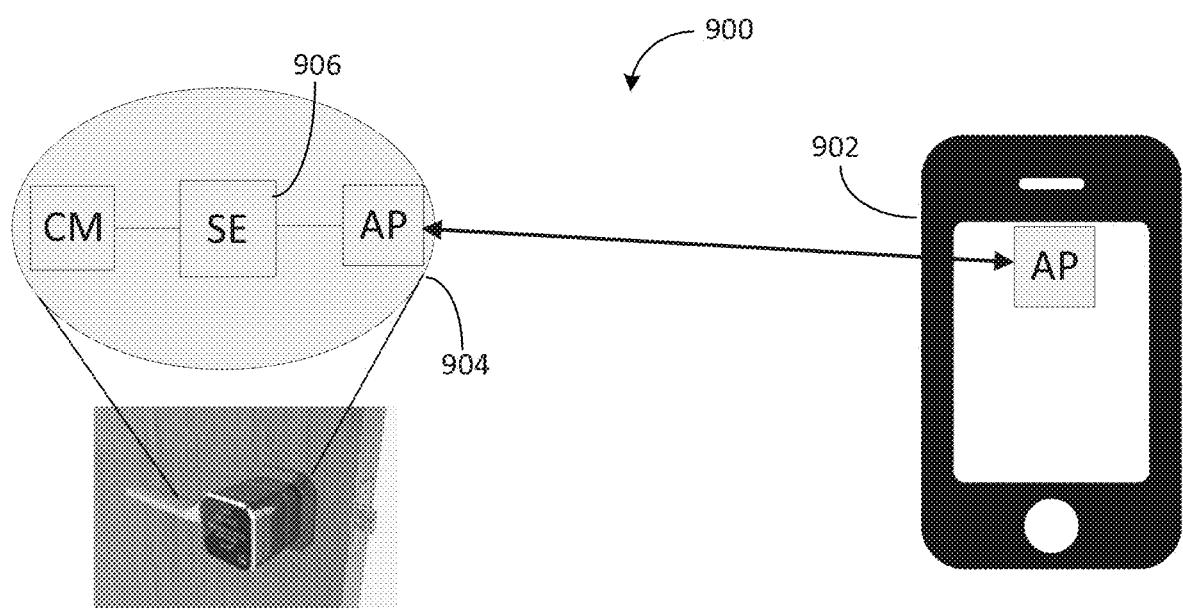
FIG. 9 illustrates an example system according to this disclosure.

While the above embodiments show implementations where both electronic device and an IoT device have a secure element, other embodiments may only have a secure element on a single device or be connected through a device with a secure element. FIG. 9 illustrates one such example system 900 according to his disclosure. As shown in FIG. 9, only the IoT device 904 includes a secure element 906. The secure element 906 can be used to determine whether a certificate provided during pairing shows the command came from the first device 902 and whether to execute the command. While not depicted, the secure element may optionally be in another configuration (e.g., on the first device 902).

Figure 10:
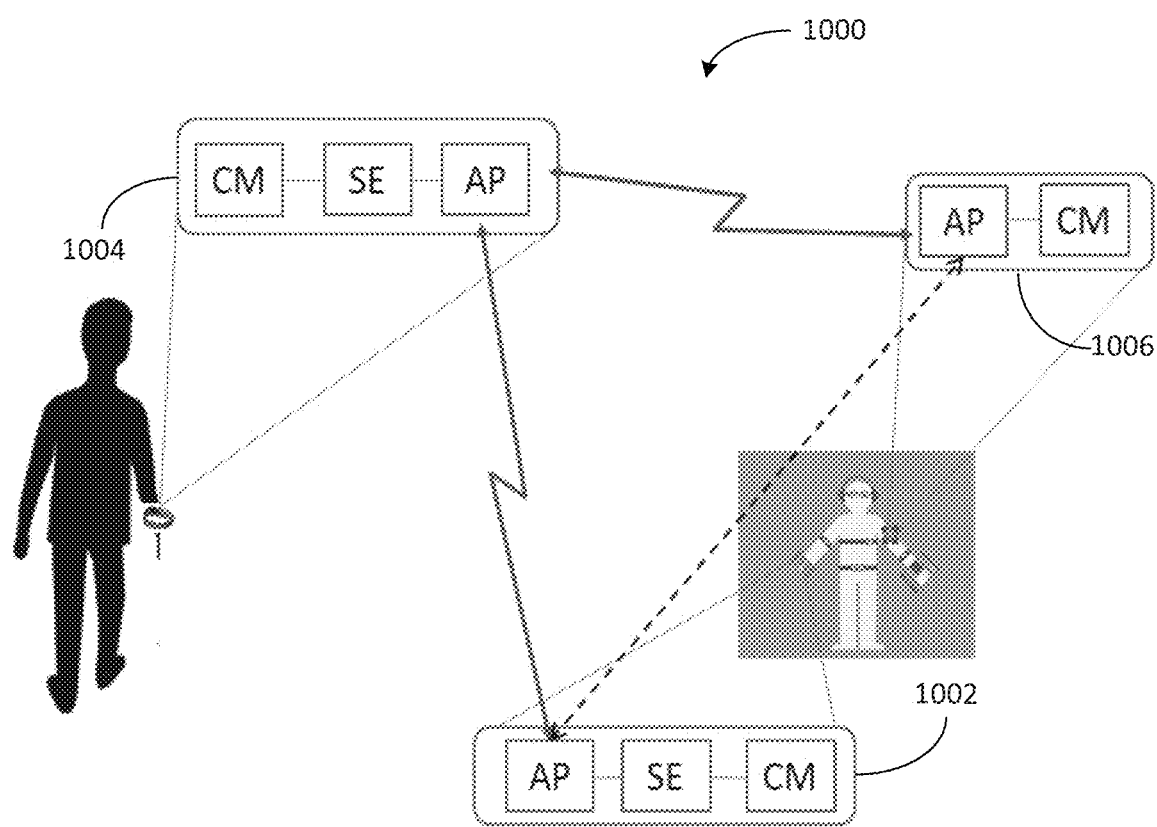
FIG. 10 illustrates an example system according to this disclosure.

In another example as illustrated in FIG. 10, a system 1000 may include other devices that may be networked through a device with a secure element. As shown in FIG. 10, a device 1002 (e.g., child's mobile phone) is connected to an electronic device 1004 with the application processor, secure element, and control module combination (e.g., a parent's wearable or other mobile device). The electronic device 1004 may be connected to additional devices 1006 (e.g., patches which may monitor health where such patches are affixed to the child). Each additional device 1006 may just have an application processor and a control module. Those additional devices 1006 may have functions with varying security levels. The electronic device 1004 may query the additional device 1006 for information. The additional device 1006 may recognize electronic device 1004. Depending on the information requested, the additional device 1006 may respond in different ways. If the information is a low security such as information that does not include personal information (e.g., merely asking for a healthy or not healthy) the additional device 1006 may respond directly. If the information is more sensitive, e.g., personal information, the additional device 1006 may ask if the electronic device 1004 is trusted. Upon receiving an affirmative response, the additional device 1006 may supply the information. If a negative response is received, no information is provided.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A connected device comprising:
   an application processor configured to receive a control command from an electronic device and transmit the control command to a secure element;
   the secure element connected between the application processor and a control module, the secure element configured to:
   authenticate the control command; and
   authorize the control command based on an authorization policy, wherein the authorization policy includes commands based on a role of the electronic device; and
   the control module is configured to:
   receive the control command, from the secure element when the control command is authenticated and authorized by the secure element;
   execute the control command to activate at least one function of the connected device; and
   transmit an authentication response to the electronic device.

2. The connected device of claim 1, further comprising a split bus having a first bus and a second bus, the first bus is configured to electrically couple the application processor to the secure element and the second bus is configured to electrically couple the control module to the secure element.

3. The connected device of claim 1, wherein the connected device is paired with the electronic device over a wireless communication channel.

4. The connected device of claim 3, wherein the secure element of the connected device is configured to execute an authenticated key exchange with a secure element of the electronic device.

5. The connected device of claim 4, wherein the authenticated key exchange generates a session key used to encrypt or decrypt the control command.

6. The connected device of claim 1, wherein the connected device is configured to communicate with the electronic device through a trusted server.

7. The connected device of claim 6, wherein the secure element transmits a public key to the trusted server.

8. The connected device of claim 6, wherein the secure element receives a public key of the electronic device from the trusted server.

9. The connected device of claim 1, wherein the connected device is an automobile and the at least one function includes at least one of controlling door locks, starting the automobile, or controlling lights.

10. The connected device of claim 1, wherein the connected device is a dongle configured to connect to an automobile.

11. A method for controlling a connected device with an electronic device, the method comprising:
   receiving a first public key from a secure element of the electronic device;
   transmitting a second public key from a secure element of the connected device to the electronic device;
   connecting to the electronic device based on the first public key and the second public key;
   receiving, by an application processor of the connected device, a control command from the electronic device;
   authenticating, by the secure element of the connected device, the control command transmitted from the electronic device via the application processor of the connected device, the secure element of the connected device being connected between the application processor of the connected device and a control module of the connected device;

authorizing, by the secure element of the connected device, the control command from the electronic device based on an authorization policy, wherein the authorization policy includes commands based on a role of the electronic device;

receiving, by the control module of the connected device, the control command when the control command is authenticated and authorized by the secure element of the connected device;

executing, by the control module of the connected device, the control command; and transmitting, by the control module of the connected device, an authentication response to the electronic device.

12. The method of claim 11, wherein pairing of the electronic device and the connected device is performed through a trusted server.

13. The method of claim 11, wherein pairing of the electronic device and the connected device is performed over a wireless communication channel.

14. The method of claim 11, further comprising executing an authenticated key exchange to generate a session key.

15. The method of claim 14, wherein the session key is used to encrypt or decrypt the control command.

16. A non-transitory computer readable medium including a plurality of instructions that, when executed by a processor, are configured to cause the processor to:

receive a first public key from a secure element of an electronic device;

transmit a second public key from a secure element of a connected device to the electronic device;

connect to the electronic device based on the first public key and the second public key;

receive, by an application processor of the connected device, a control command from the electronic device;

authenticate, by the secure element of the connected device, the control command transmitted from the electronic device via the application processor of the connected device, the secure element of the connected device being connected between the application processor of the connected device and a control module of the connected device;

authorize, by the secure element of the connected device, the control command from the electronic device based on an authorization policy, wherein the authorization policy includes commands based on a role of the electronic device;

receive, by the control module of the connected device, the control command when the control command is authenticated and authorized by the secure element of the connected device;

execute, by the control module of the connected device, the control command; and transmit, by the control module of the connected device, an authentication response to the electronic device.

17. The non-transitory computer readable medium of claim 16, wherein pairing of the electronic device and the connected device is performed through a trusted server.

18. The non-transitory computer readable medium of claim 16, wherein pairing of the electronic device and the connected device is performed over a wireless communication channel.

19. The non-transitory computer readable medium of claim 16, wherein the plurality of instructions is further configured to cause the processor to execute an authenticated key exchange to generate a session key.

20. The non-transitory computer readable medium of claim 19, wherein the session key is used to encrypt or decrypt the control command.

* * * * *